(12) United States Patent
Fox

(10) Patent No.: US 11,821,265 B2
(45) Date of Patent: Nov. 21, 2023

(54) DRILL PIPE WITH FLUTED GUN DRILLED PASSAGEWAY

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 0 days.

(21) Appl. No.: 17/734,004

(22) Filed: Apr. 30, 2022

(65) Prior Publication Data
US 2022/0251907 A1  Aug. 11, 2022

(51) Int. Cl.
| | |
|---|---|
| *E21B 17/02* | (2006.01) |
| *E21B 17/00* | (2006.01) |
| *H02G 3/04* | (2006.01) |
| *H02G 3/06* | (2006.01) |
| *E21B 17/042* | (2006.01) |

(52) U.S. Cl.
CPC .......... *E21B 17/028* (2013.01); *E21B 17/003* (2013.01); *E21B 17/042* (2013.01); *H02G 3/0487* (2013.01); *H02G 3/06* (2013.01)

(58) Field of Classification Search
CPC .... E21B 17/003; E21B 17/042; E21B 17/028; H02G 3/0487; H02G 3/06
See application file for complete search history.

(56) References Cited

U.S. PATENT DOCUMENTS

| | | | | | |
|---|---|---|---|---|---|
| 2,303,108 | A | * | 11/1942 | Blackburn | H02G 7/06 403/396 |
| 9,044,798 | B2 | * | 6/2015 | Peter | B21C 23/085 |
| 2005/0173128 | A1 | * | 8/2005 | Hall | E21B 17/003 166/380 |
| 2014/0284065 | A1 | * | 9/2014 | Fraignac | E21B 17/042 166/242.6 |

* cited by examiner

*Primary Examiner* — D. Andrews

(57) ABSTRACT

A modified tubular system for use in connection with the recovery of subsurface minerals and fluids. The tubulars may include drill pipes, risers, production tubing, and tools integrated into such tubulars. Such tubulars may be interconnected using tool joints or threaded tubular sections. Some tool joints may comprise annular shoulders. The shoulders may comprise an annular groove for housing an inductive coupler that may include magnetically conductive electrically insulating (MCEI) trough and an electrically conductive coil laid within the trough. An axial passageway formed in the shoulder may open into the groove. The passageway may comprise flutes. The flutes maybe formed in the wall of the passageway or added to the passageway as an insert or as part of a passageway liner. A fluted transmission line may be disposed within the passageway. The transmission line and liner flutes may mate with the passageway flutes. The liner may be hardened.

18 Claims, 16 Drawing Sheets

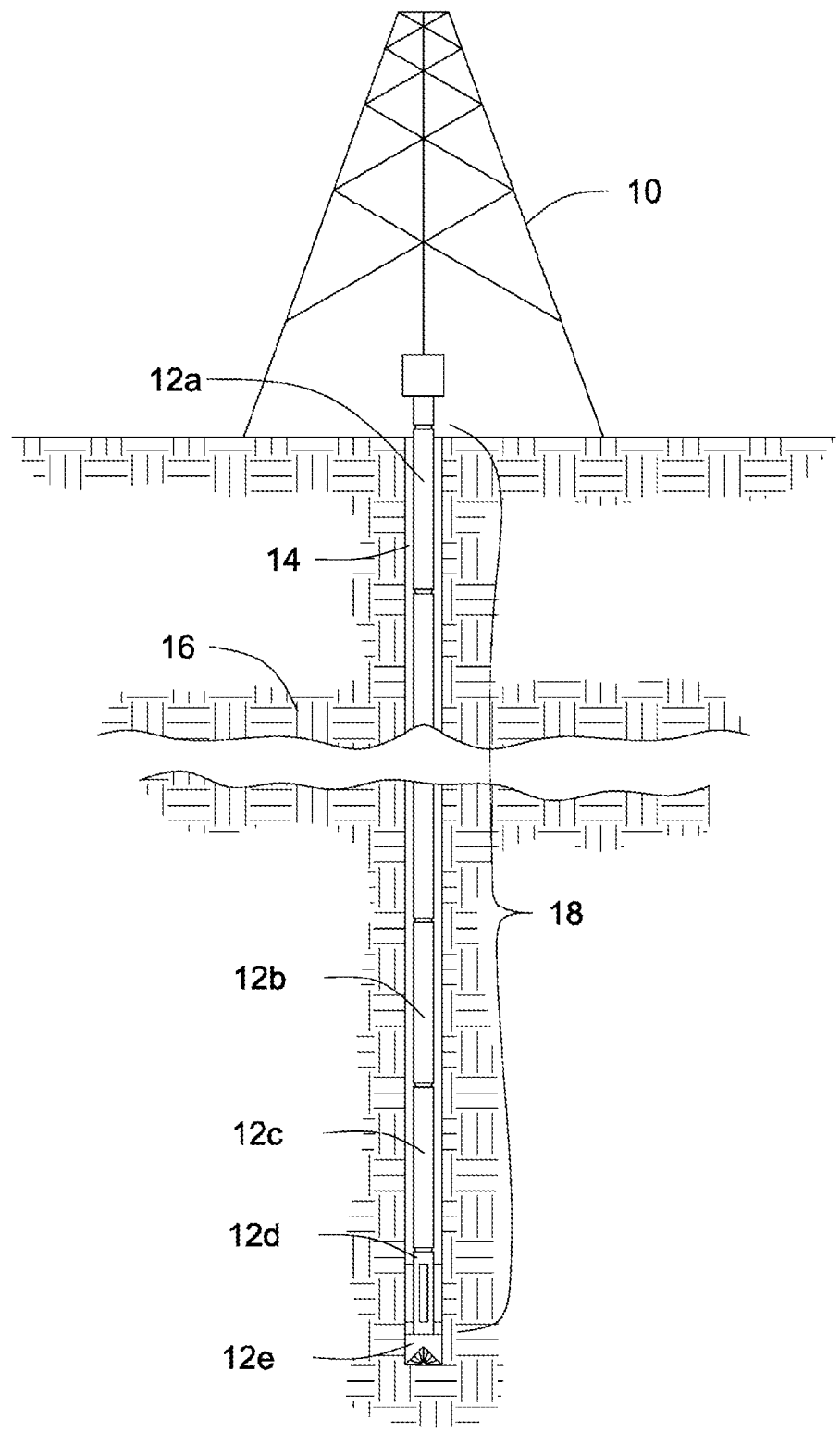
(Prior Art) FIG. 5

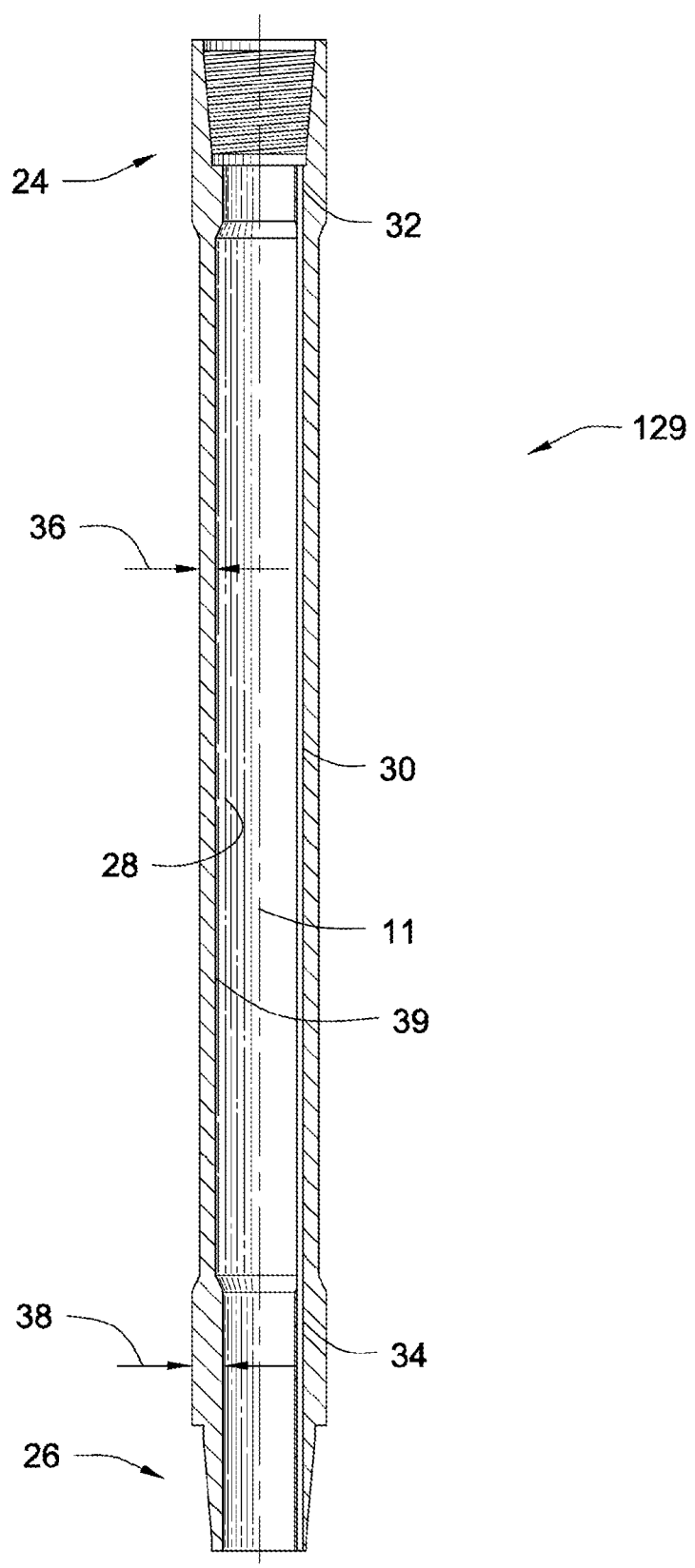
(Prior Art) FIG. 6

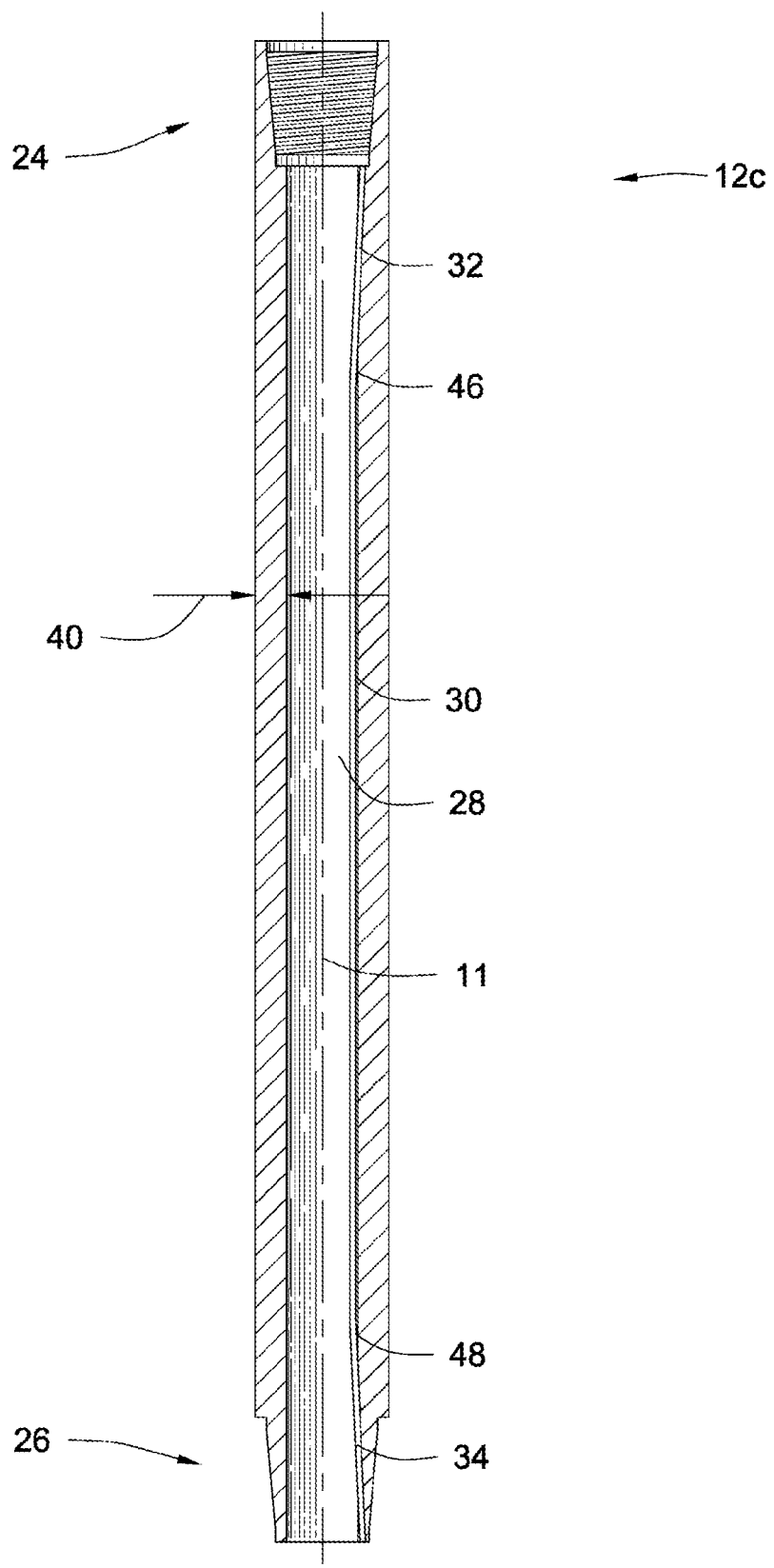
(Prior Art) FIG. 7

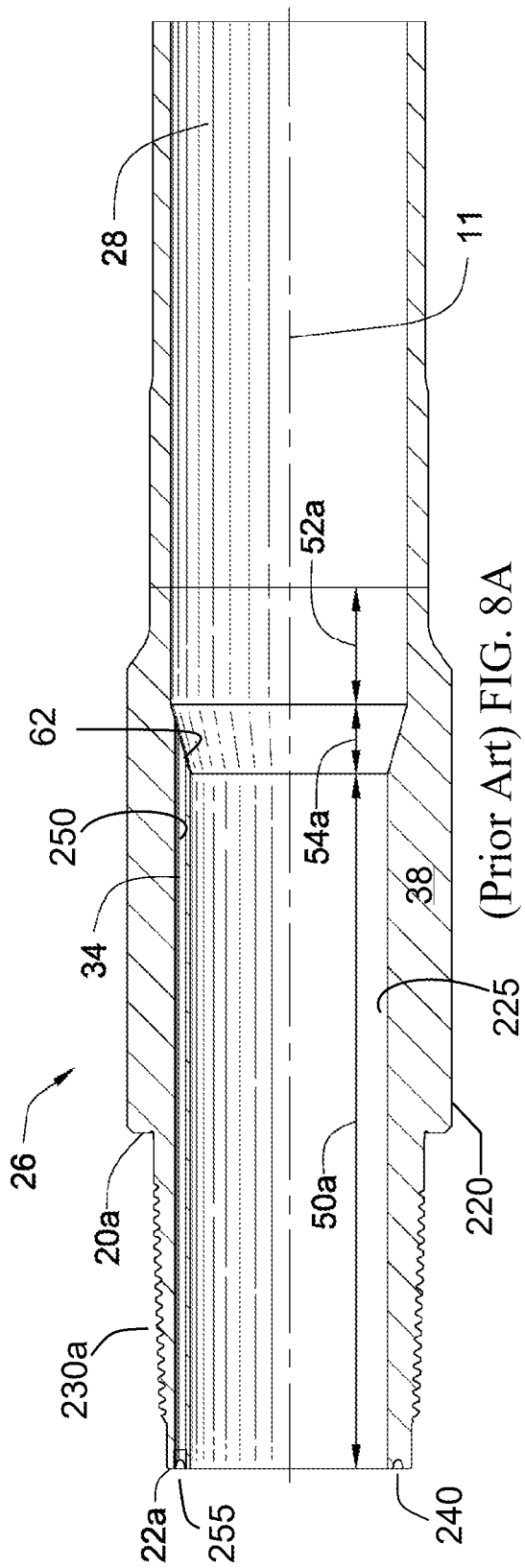
(Prior Art) FIG. 8A
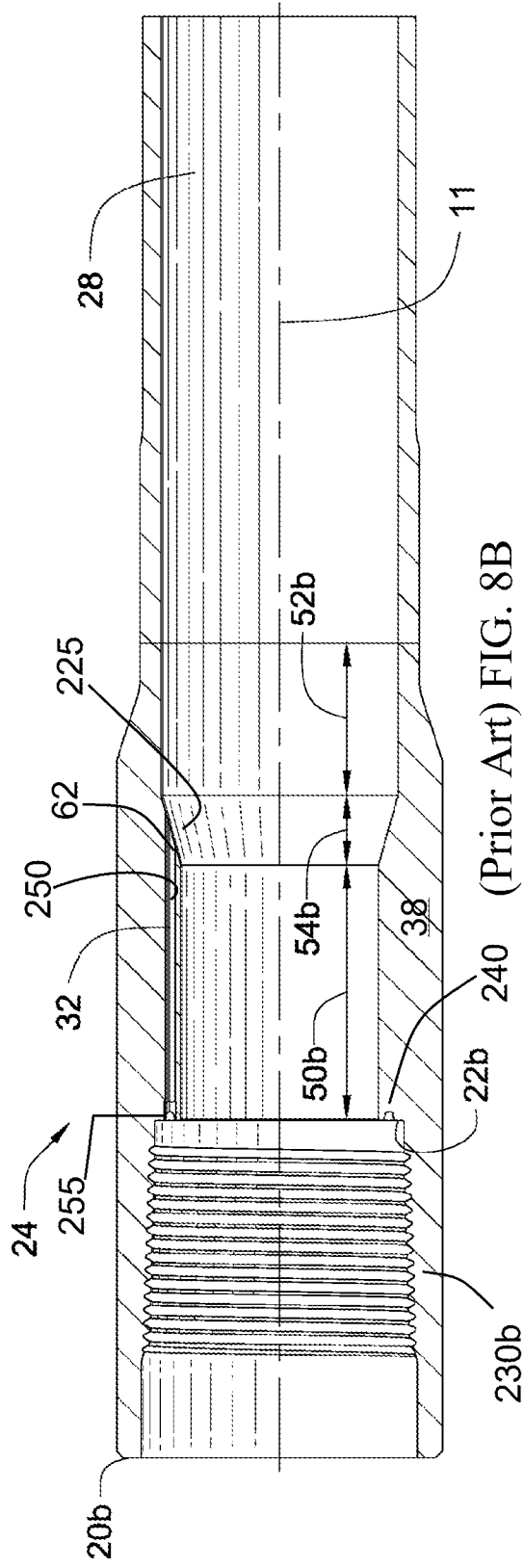
(Prior Art) FIG. 8B

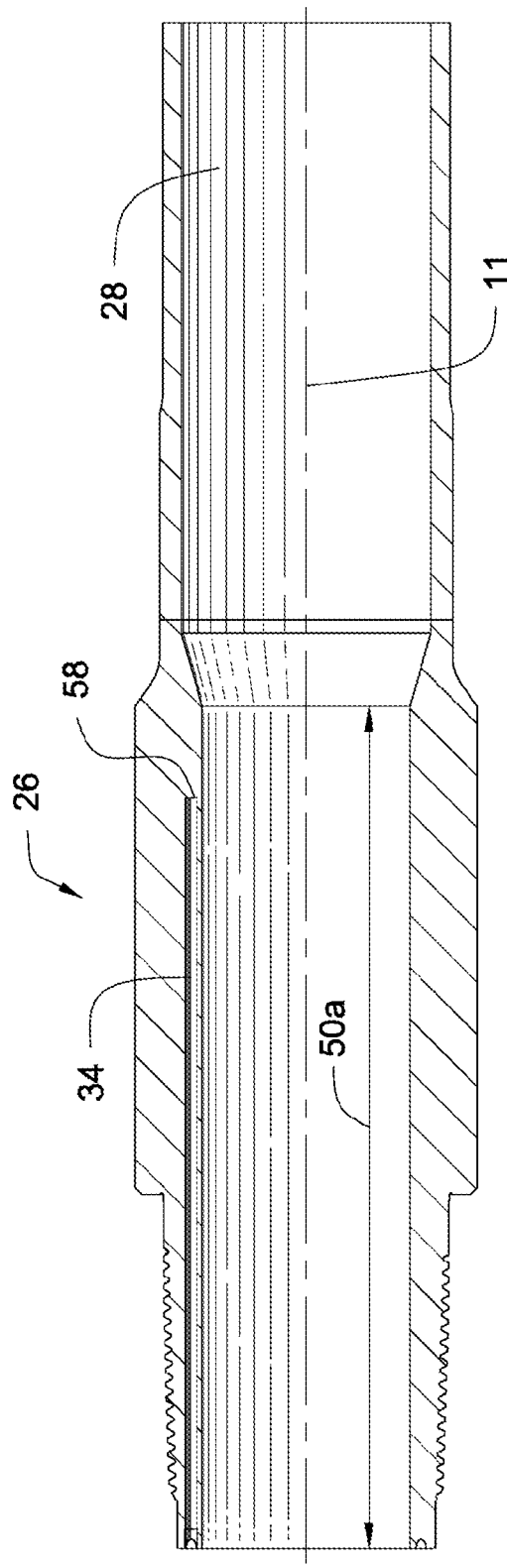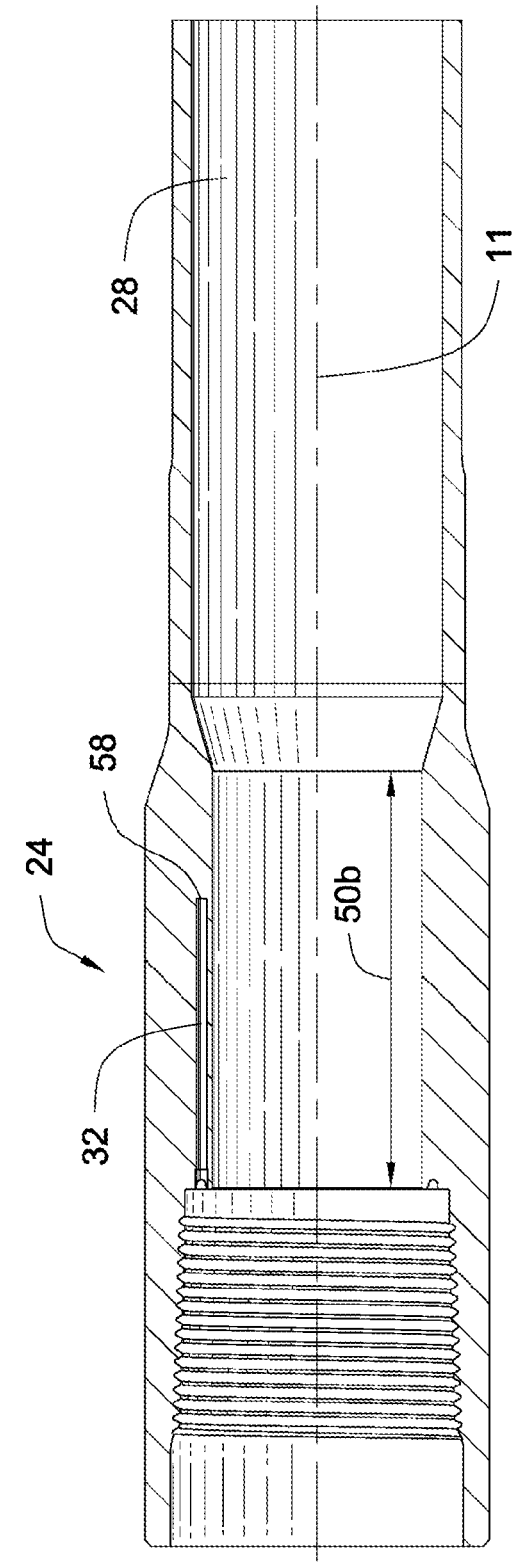
(Prior Art) FIG. 9A
(Prior Art) FIG. 9B

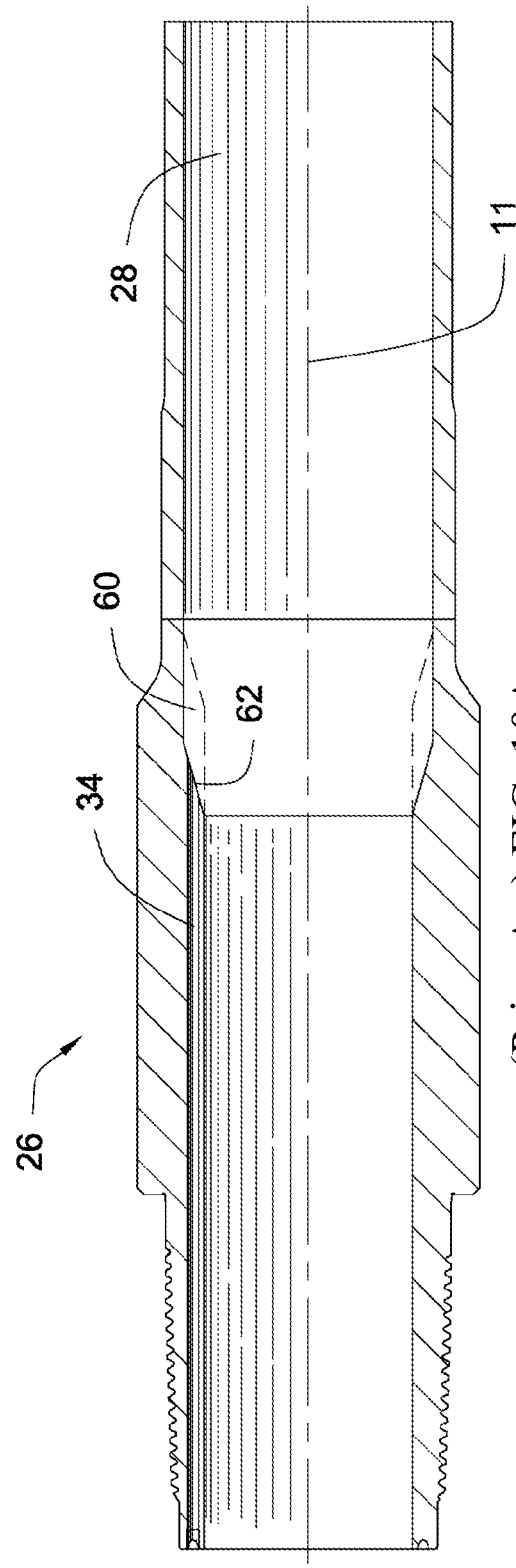
(Prior Art) FIG. 10A
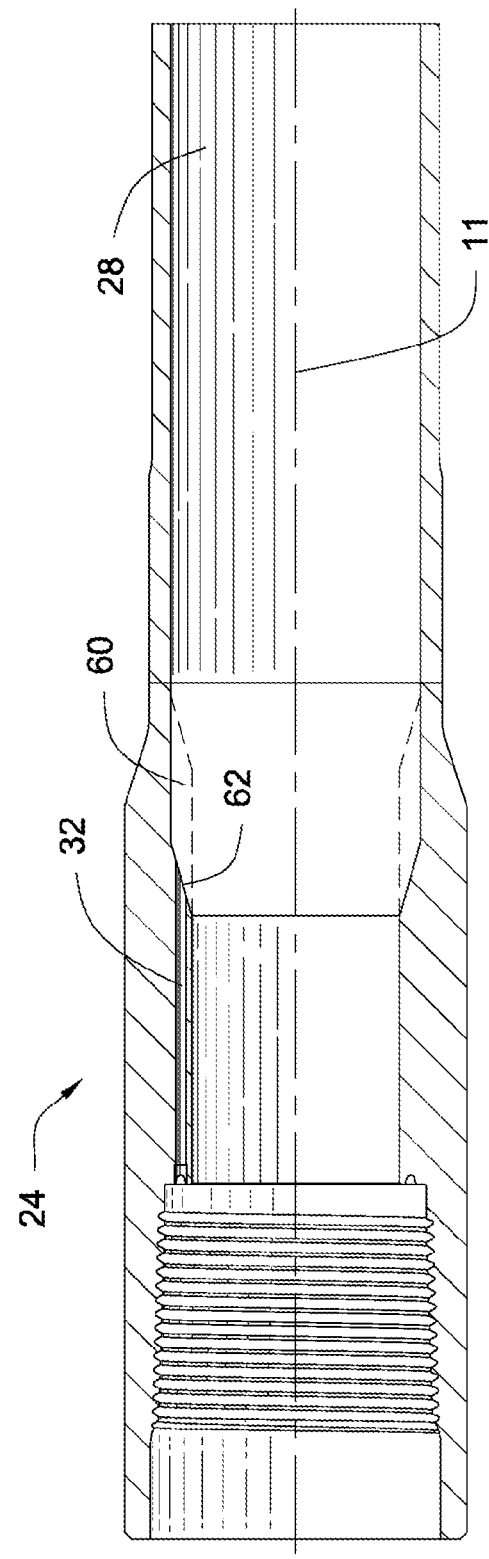
(Prior Art) FIG. 10B

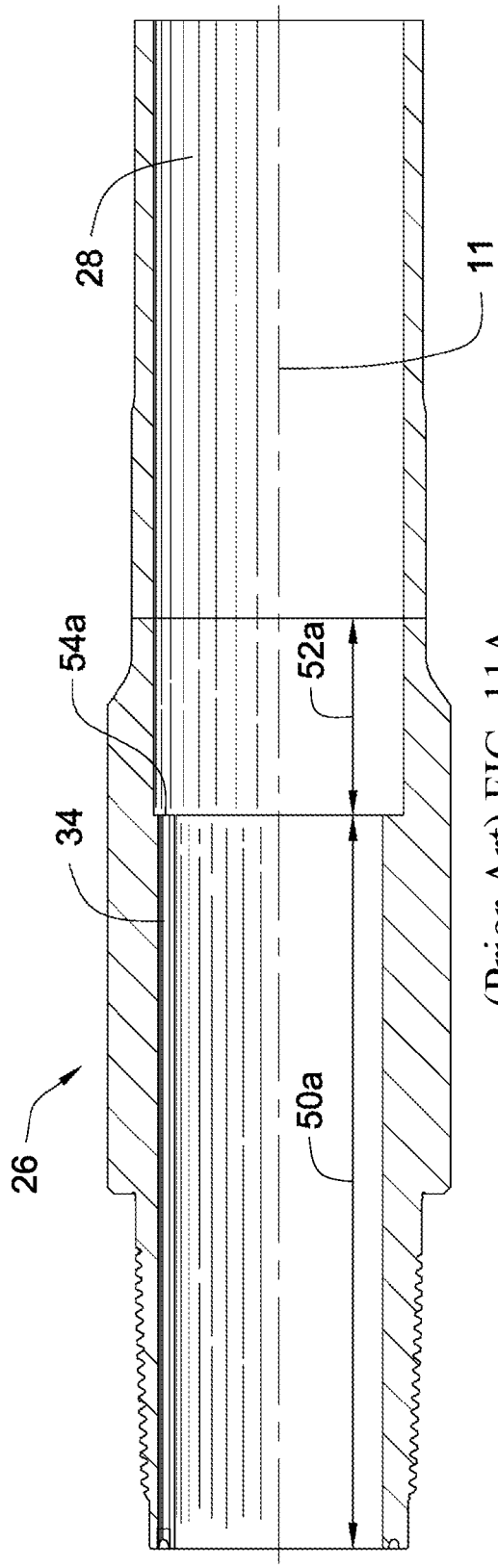
(Prior Art) FIG. 11A
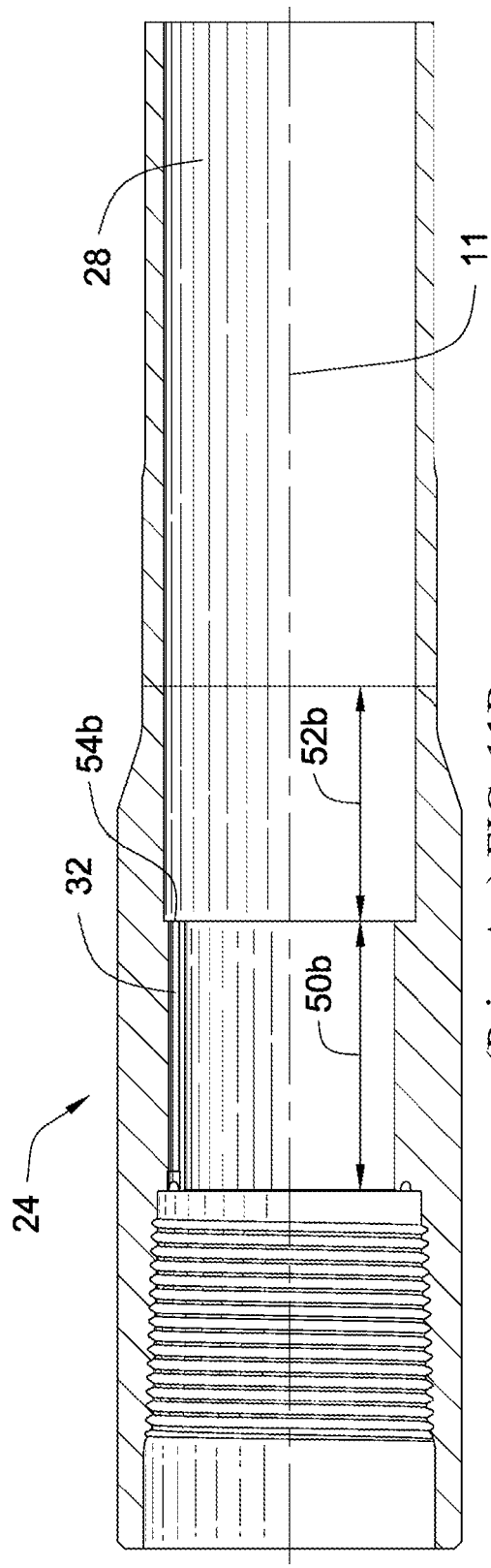
(Prior Art) FIG. 11B

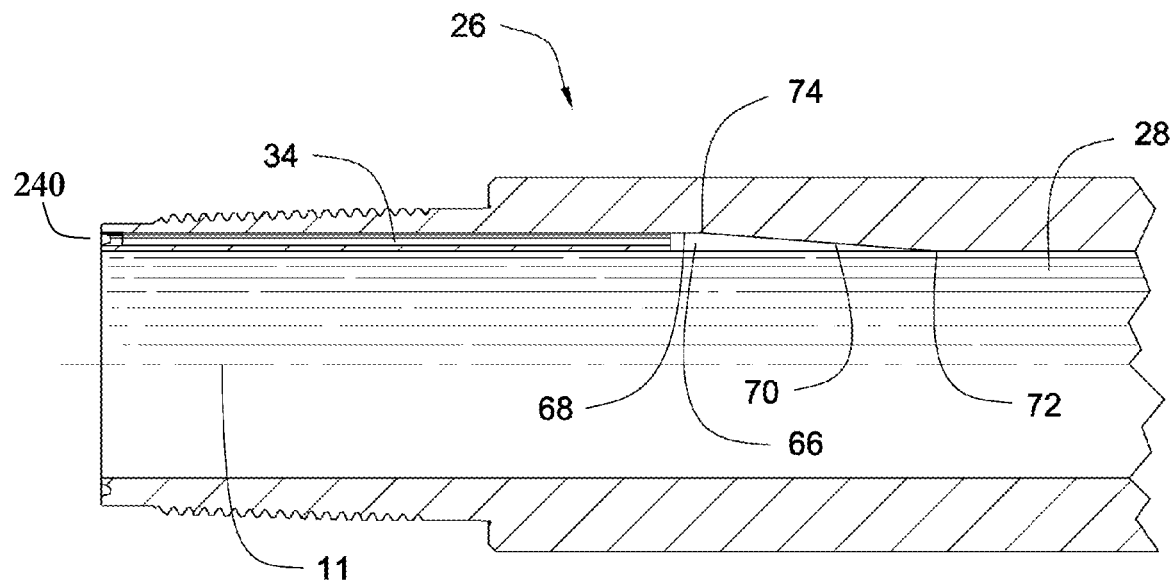
(Prior Art) FIG. 12A
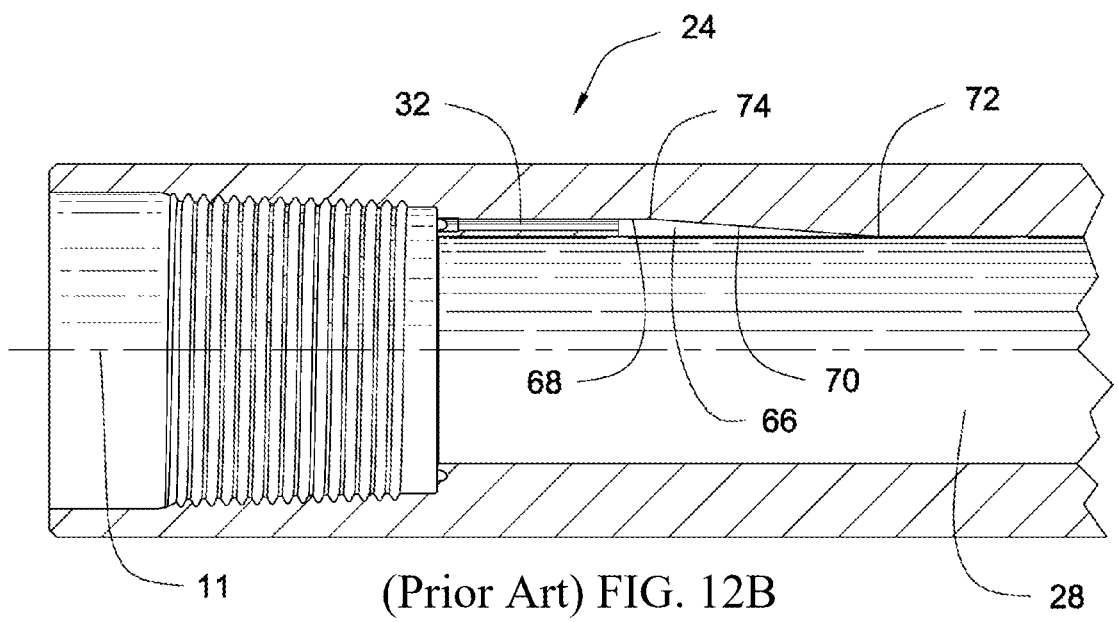
(Prior Art) FIG. 12B

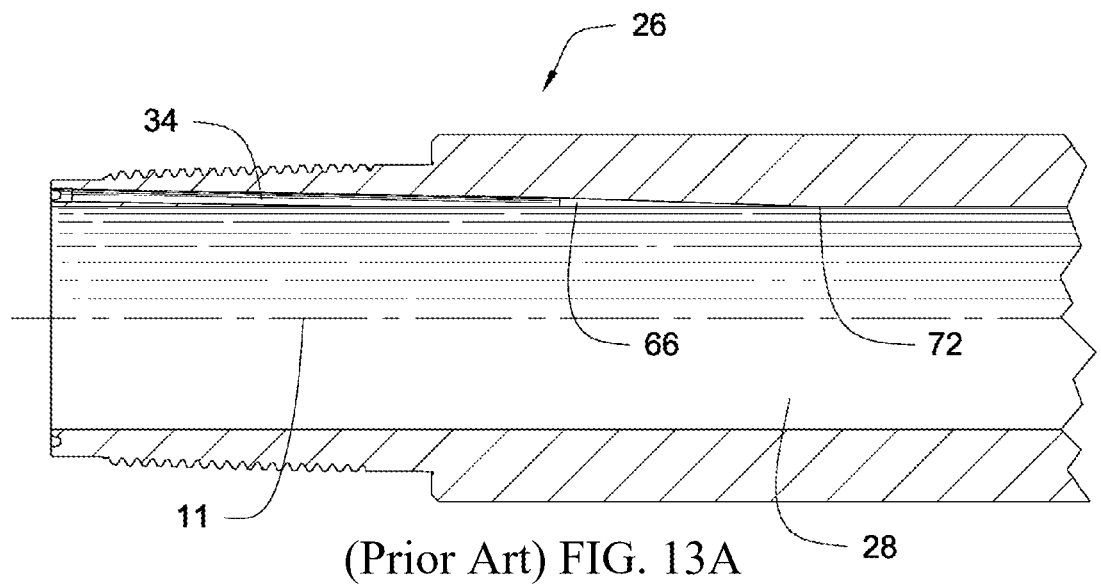
(Prior Art) FIG. 13A
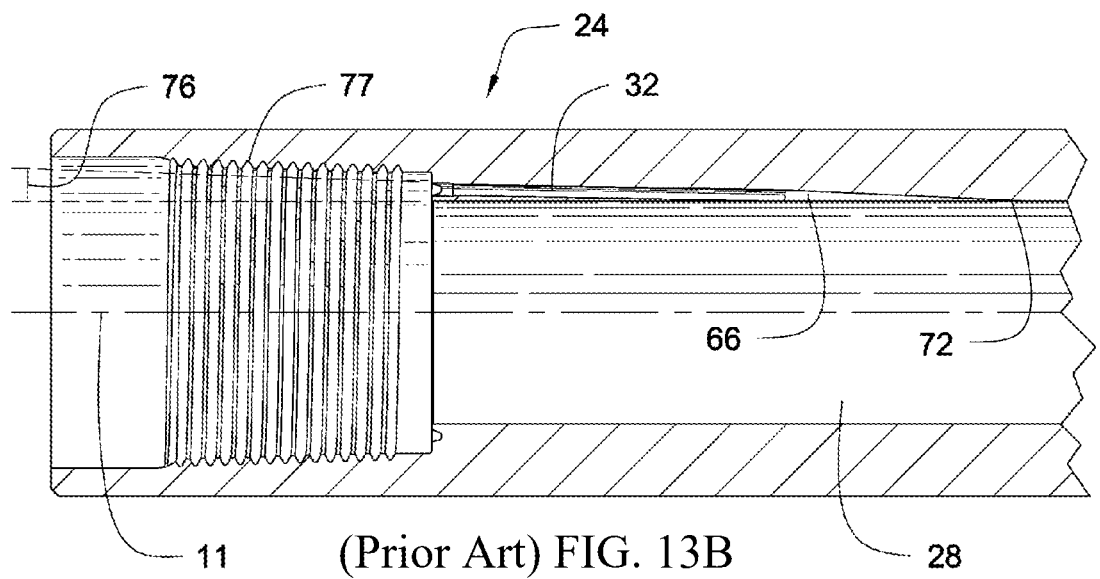
(Prior Art) FIG. 13B

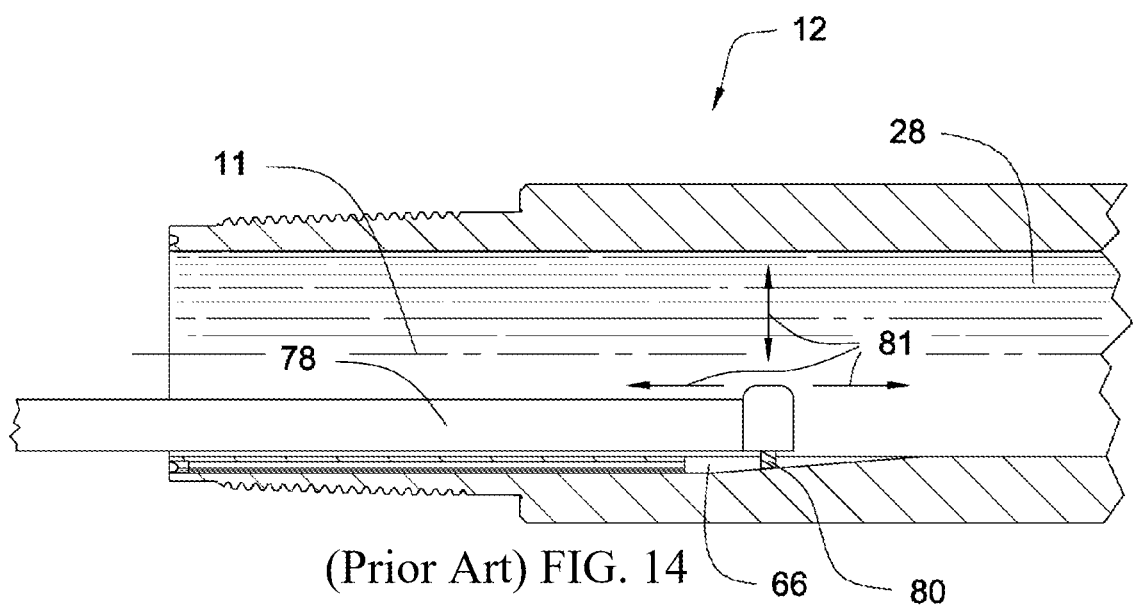
(Prior Art) FIG. 14

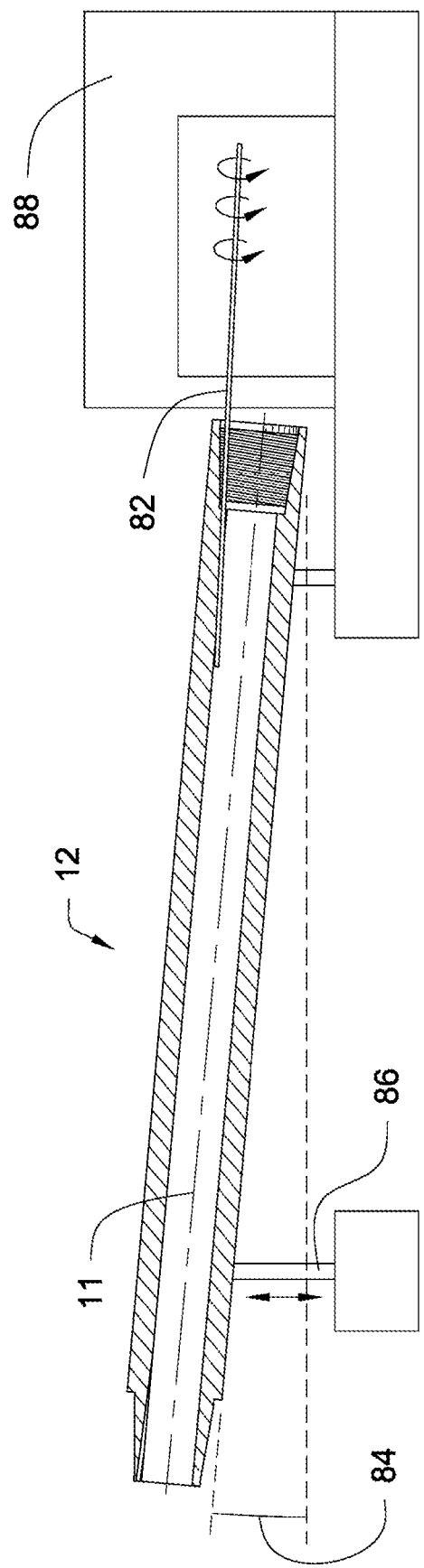
(Prior Art) FIG. 15

DRILL PIPE WITH FLUTED GUN DRILLED PASSAGEWAY

RELATED APPLICATIONS

This application is a modification of U.S. Pat. No. 7,069,999, to Hall et al., entitled Apparatus and Method for Routing a Transmission Line Through a Downhole Tool, issued Jul. 4, 2006, and incorporated herein by this reference. The prior art figures and related text art taken from the '999 reference and are applicable to the teachings of this application except for the modifications described herein and as shown in FIGS. 1-4 and FIGS. 16 and 17.

BACKGROUND OF INVENTION

In the downhole drilling industry, MWD and LWD tools are used to take measurements and gather information with respect to downhole geological formations, status of downhole tools, conditions located downhole, and the like. Such data is useful to drill operators, geologists, engineers, and other personnel located at the surface. This data may be used to adjust drilling parameters, such as drilling direction, penetration speed, and the like, to accurately tap into oil, gas, or other mineral bearing reservoirs. Data may be gathered at various points along the drill string. For example, sensors, tools, and the like, may be located at or near the bottom hole assembly and on intermediate tools located at desired points along the drill string. Nevertheless, data gathering and analysis do not represent the entire process. Once gathered, apparatus and methods are needed to rapidly and reliably transmit the data to the earth's surface. Traditionally, technologies such as mud pulse telemetry have been used to transmit data to the surface. However, most traditional methods are limited to very slow data rates and are inadequate for transmitting large quantities of data at high speeds.

In order to overcome these limitations, various efforts have been made to transmit data along electrical or other types of cable integrated directly into drill string components, such as sections of drill pipe. In such systems, electrical contacts or other transmission elements are used to transmit data across tool joints or connection points in the drill string. Nevertheless, many of these efforts have been largely abandoned or frustrated due to unreliability and complexity. For example, one challenge is effectively integrating a transmission line into a downhole tool, such as a section of drill pipe. Due to the inherent nature of drilling, most downhole tools have a similar cylindrical shape defining a central bore. The wall thickness surrounding the central bore is typically designed in accordance with weight, strength, and other constraints imposed by the downhole environment. In some cases, milling or forming a channel or passageway in the wall of a downhole tool to accommodate a transmission line may critically weaken the wall. Thus, in certain embodiments, the only practical route for a transmission line is through the central bore of the downhole tool.

At or near the box end and pin end of the downhole tool, a transmission line may be routed from the central bore through the tool wall. This may be done for several reasons. First, the box end and pin end are typically constructed with thicker walls to provide additional strength at the tool joints. This added thickness is many times sufficient to accommodate a channel or passageway without critically weakening the wall. Second, transmission elements are typically installed in the box end and pin end to transmit information across the tool joints. These transmission elements are typically embedded within recesses formed in the box end and pin end. Thus, channel or passageways are needed in the box end and pin end to provide a path for the transmission line between the transmission elements and the central bore of the downhole tool. Thus, what are needed are apparatus and methods for installing channel or passageways in the box end and pin end of downhole tools to provide routes for transmission lines traveling between transmission elements and the central bore.

What are further needed are improved apparatus and methods for providing a smooth path for a transmission line routed through a downhole tool to prevent kinking or other damage. What are further needed are improved apparatus and methods for effectively drilling or otherwise forming channel or passageways in the box end and pin end of a downhole tool. Finally, what are needed are apparatus and methods to minimize the expense and labor required to install these channel or passageways in the box end and pin end of a downhole tool.

SUMMARY OF INVENTION

With regard to FIGS. 1-4, and FIGS. 16 and 17, this application presents a modified tubular system for reaching subsurface fluids and minerals. (Spaces between components are for clarity and may not be present in actual practice.) The modified tubular system may comprise a drill string, risers, production tubing, casings, drill bits, and other tools associated with a tubular system that may be found in a bottom hole assembly.

The modified tubular system may comprise one or more an annular tool joints. The annular tool joints and may comprise a threaded pin end configuration or a threaded box end configuration. The annular tool joints may comprise an annular wall varying in thickness separating an outside wall surface from an inside wall surface.

The annular wall may comprise a pin threaded portion or a box threaded portion. The annular wall may comprise a pin end annular secondary shoulder and a box end secondary shoulder adjacent the threaded portions, respectively. The secondary shoulders may comprise an annular recess or groove.

One or more axial channels or passageways may be formed into the respective tool joints. The respective channels or passageways may comprise a passageway inner wall within at least a portion of the annular wall. The passageways may comprise a first opening in the annular recess or groove in the annular secondary shoulders and a second opening in the inside wall surface of the tool joints.

At least a portion of the one or more channels or passageways may comprise at least a portion of one or more flutes along the passageways' inner wall surfaces. The passageway flutes may aid in securing a transmission line from axial and rotational movement within the passageway. The passageway flutes may comprise one or more grooves and lands. The one or more passageway flutes may intersect at least one of the openings. The one or more passageway flutes may initiate apart from the openings. The one or more passageway flutes may terminate apart from the openings. Also, the one or more passageway flutes may proceed substantially linearly along the passageways between the openings. The respective flutes may proceed continuously or intermittently along the passageways. Additionally, the one or more passageway flutes may proceed substantially spirally along the passageways, continuously or intermittently, between the openings.

The passageway flutes may be formed into the inner wall surfaces by machining operations such as drilling, milling, rifling, broaching, and through die forming by causing a progressive die comprising a desired flute form to be passed through the passageway.

The first opening may comprise a diameter greater than the diameter of the second opening. The passageways may at least partially taper inwardly from the first opening toward the second opening.

Optionally, at least a portion of the one or more passageway flutes along the passageways' inner wall may comprise a removable flute insert. The removable flute insert may comprise a linearly tapered configuration. And it may be wedged between the passageways' inner wall and the outer wall of the transmission line. The removable flute insert may comprise an annular configuration. The annular removable flute insert may also comprise a tapered configuration corresponding to the taper of the passageways.

The passageways may comprise a removable annular liner comprising an outer wall surface and an inner wall surface. The outer wall surface of the removable annular liner may comprise flutes corresponding to and suitable for mating with the passageway flutes. The outer wall surface of the removable annular liner may comprise a tapered portion corresponding to the taper of the passageways. Furthermore, the inner wall surface of the removable annular liner may comprise flutes suitable for mating with the flutes of the transmission line conduit. The inner wall surface of the annular liner may comprise a taper corresponding to the taper of the passageways.

The tubular transmission line may be disposed within the passageways. The tubular transmission line may comprise a coaxial cable housed within a metal tube. The tubular transmission line may comprise one or more axial flutes along its exterior surface. The one or more passageway flutes may mate with the tubular transmission line flutes when the transmission line is disposed within the passageways. The tubular transmission line may at least partially house coaxial cable comprising a dielectric material as an insulator surrounding a center electrical conductor.

The removable annular liner may comprise a hardness as measured on the Rockwell C scale greater than the hardness of the annular tool joints. The shoulder groove and the passageways may also comprise hardened surfaces. Surface hardening may be achieved through shot peening, laser peening, brinelling, or chemical coating processes.

The following portion of the summary is taken from the '999 reference which teachings apply equally to the present invention except for the modification described herein.

In view of the foregoing, it is a primary object of the present invention to provide apparatus and methods for installing paths or channel or passageways in the box end and pin end of a downhole tool to provide a route for a transmission line traveling between transmission elements and the central bore. It is a further object to provide improved apparatus and methods for smoothing the path or route of a transmission line to prevent kinking or other damage to a transmission line routed through a downhole tool. It is yet a further object to provide improved apparatus and methods for effectively drilling or forming channel or passageways in the box end and pin end of a downhole tool. Finally, it is a further object to minimize the expense and labor required to form these channel or passageways in the box end and pin end of a downhole tool.

Consistent with the foregoing objects, and in accordance with the invention as embodied and broadly described herein, a method for routing a transmission line through a tool joint having a primary and secondary shoulder, a central bore, and a longitudinal axis, is disclosed in one embodiment of the invention as including drilling a straight channel or passageway, at a positive, nominal angle with respect to the longitudinal axis, through the tool joint from the secondary shoulder to a point proximate the inside wall of the central bore. The method further includes milling back, from within the central bore, a second channel or passageway to merge with the straight channel or passageway, thereby forming a continuous channel or passageway from the secondary shoulder to the central bore.

In selected embodiments, drilling includes gun-drilling the straight channel or passageway. In other embodiments, the method includes tilting the tool joint before drilling to produce the positive, nominal angle. In selected embodiments, tilting includes adjusting the tilt before drilling to provide a desired positive, nominal angle. In selected embodiments, the positive, nominal angle is less than or equal to 15 degrees.

In certain embodiments, the straight channel or passageway does not break into the central bore. In other embodiments, the straight channel or passageway breaks into the central bore at a non-perpendicular angle. In such embodiments, a backing member may be inserted into the central bore to facilitate drilling into the central bore at the non-perpendicular angle. In other embodiments, milling back includes milling the second channel or passageway with a milling tool inserted into the central bore. This milling process may be used to open the straight channel or passageway to the central bore.

In another aspect of the invention, an apparatus in accordance with the invention includes a tool joint of a downhole tool, wherein the tool joint includes a primary and secondary shoulder, a central bore, and a longitudinal axis. The apparatus further includes a gun-drilled channel or passageway formed in the tool joint from the secondary shoulder to a point proximate the central bore, and an open channel or passageway milled from the central bore to the gun-drilled channel or passageway, such that the gun-drilled channel or passageway and the open channel or passageway merge to form a continuous channel or passageway.

In selected embodiments, the gun-drilled channel or passageway is drilled at a positive, nominal angle with respect to the longitudinal axis. In some cases, this positive, nominal angle is less than or equal to 15 degrees. In selected embodiments, the gun-drilled channel or passageway does not break into the central bore. In other embodiments, the gun-drilled channel or passageway breaks into the central bore at a non-perpendicular angle. In yet other embodiments, the gun-drilled channel or passageway breaks into the central bore substantially perpendicularly. In some cases, the open channel or passageway is milled with a milling tool inserted into the central bore.

In another aspect of the invention, a method for routing a transmission line through a tool joint of a downhole tool, wherein the tool joint includes primary and secondary shoulders, a tool wall, a central bore, and a longitudinal axis, includes increasing the inside diameter of a portion of the central bore to provide a first portion having a standard diameter, and a second portion having an enlarged diameter. The method further includes drilling a channel or passageway through the tool wall from the secondary shoulder to an exit point within the second portion.

In selected embodiments, drilling includes gun-drilling that may or may not break into the central bore. In other embodiments, drilling includes milling back from the central bore to the gun-drilled channel or passageway. In certain cases, this milling process opens up the channel or passageway to the central bore. In selected embodiments, the channel or passageway breaks into the central bore at a non-perpendicular angle. In such cases, a backing member may be inserted into the central bore to facilitate drilling into the central bore at a non-perpendicular angle. In other embodiments, the channel or passageway breaks into the central bore at a substantially perpendicular angle.

In another aspect of the invention, a method for routing a transmission line through a downhole tool having primary and secondary shoulders, a central bore, and a longitudinal axis, includes drilling a straight channel or passageway through the downhole tool from the secondary shoulder to a point proximate the inside wall of the central bore. The method further includes milling back, from within the central bore, a second channel or passageway effective to merge with the straight channel or passageway, to form a continuous channel or passageway from the secondary shoulder to the central bore.

In yet another aspect of the invention, a method for routing a transmission line through a tool joint having primary and secondary shoulders, a central bore, and a longitudinal axis, includes drilling a straight channel or passageway, at a positive, nominal angle with respect to the longitudinal axis, through the tool joint from the secondary shoulder to the central bore.

BRIEF DESCRIPTION OF DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings.

(Prior Art) FIG. 5 is a cross-sectional view illustrating one embodiment of a drill rig in accordance with the invention.

(Prior Art) FIG. 6 is a cross-sectional view illustrating one embodiment of a transmission line integrated into a downhole tool, such as a section of drill pipe.

(Prior Art) FIG. 7 is a cross-sectional view illustrating one embodiment of a transmission line integrated into a heavyweight downhole tool, such as a section of heavyweight drill pipe.

(Prior Art) FIGS. 8A and 8B are two cross-sectional views illustrating the box end and pin end of a section of drill pipe, wherein part of the central bore is enlarged to provide a shorter path for a transmission line through the tool joint.

(Prior Art) FIGS. 9A and 9B are two cross-sectional views of the box end and pin end of a section of drill pipe, wherein channel or passageways are only partially drilled through the tool wall.

(Prior Art) FIGS. 10A and 10B are two cross-sectional views of the box end and pin end illustrated in FIGS. 9A and 9B, wherein part of the central bore is enlarged to expose the channel or passageways to the central bore.

(Prior Art) FIGS. 11A and 11B are two cross-sectional views of the box end and pin end of a section of drill pipe, wherein channel or passageways exit perpendicularly into the central bore.

(Prior Art) FIGS. 12A and 12B are two cross-sectional views of the box end and pin end of a section of heavyweight drill pipe, wherein channel or passageways are drilled into the tool joints and are exposed to the central bore by milling channel or passageways into the tool wall from within the central bore.

(Prior Art) FIGS. 13A and 13B are two cross-sectional views of the box end and pin end of a section of heavyweight drill pipe, wherein channel or passageways are drilled into the tool joints at a positive, nominal angle with respect to the longitudinal axis of the tool joint and are exposed to the central bore by milling channel or passageways into the tool wall from within the central bore.

(Prior Art) FIG. 14 is a cross-sectional view illustrating one embodiment of a tool used for milling channel or passageways into the inside wall of the central bore.

(Prior Art) FIG. 15 is a cross-sectional view illustrating one embodiment of an apparatus and method for drilling channel or passageways into the downhole tool, wherein the channel or passageways are drilled at a positive, nominal angle with respect to the longitudinal axis of the downhole tool.

DETAILED DESCRIPTION

Figure 1:
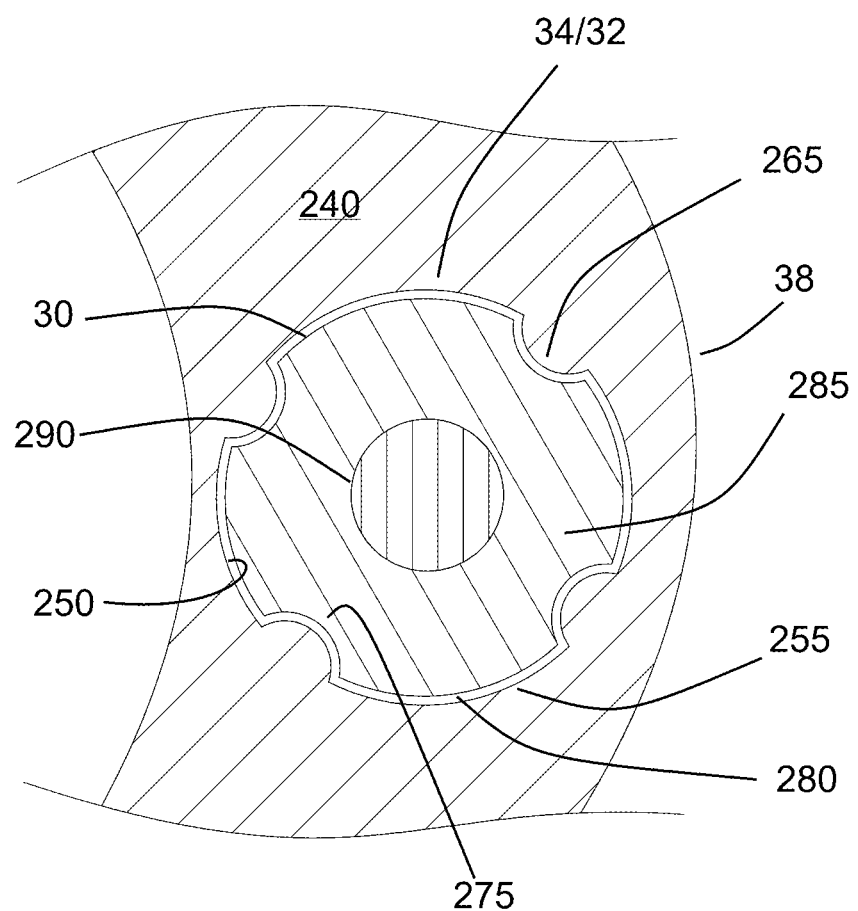
FIG. 1 is a plan view of an embodiment of a passageway comprising flutes at an opening in accordance with the present invention.

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

With respect to FIGS. 1-4, and FIGS. 16 and 17, this application presents a modified tubular system for reaching subsurface fluids and minerals. The modified tubular system may comprise a drillstring 18, risers, production tubing, casings, drill bits 12d, and other tools associated with a tubular system that may be found in a bottom hole assembly.

The modified tubular system may comprise one or more annular tool joints 24 and 26. The annular tool joints 24 and 26 may comprise a threaded pin end 230a configuration and a threaded box end 230b configuration. The annular tool joints 24 and 26 may comprise an annular wall 38 varying in thickness separating an outside wall surface 220 from an inside wall surface 225.

The annular wall 38 may comprise a pin threaded portion 230a or a box threaded portion 230b. The annular wall 38 may comprise a pin end annular secondary shoulder 22a and a box end secondary shoulder 22b adjacent the threaded portions 230a and 230b, respectively. The secondary shoulders 22a and 22b may comprise an annular recess or groove 240.

One or more axial channels or passageways 34 and 32 may be formed into the respective tool joints 26 and 24. The respective channels or passageways may comprise a passageway inner wall 250 within at least a portion of the annular wall 38. The passageways 34 and 32 may comprise a first opening 255 in the annular recess or groove 240 in the annular secondary shoulders 22a and 22b and a second opening 62 in the inside wall surface 225 of tool joints 26 and 24.

At least a portion of the one or more channels or passageways 34 and 32 may comprise at least a portion of one or more flutes 265 along the passageways 34 and 32 inner wall surfaces 250. The passageway flutes 265 may aid in securing a transmission line 30 from axial and rotational vibrations and movement within the passageways 34 and 32. The passageway flutes may comprise one or more grooves and lands. The one or more passageway flutes 265 may intersect at least one of the openings 255 and 62. The one or more passageway flutes 265 may initiate apart from the openings 255 and 62. The one or more passageway flutes 265 may terminate apart from the openings 255 and 62. Also, the one or more passageway flutes 265 may proceed substantially linearly along the passageways 34 and 32 between the openings 255 and 62. The respective flutes 265 may proceed continuously or intermittently along the passageways. Additionally, the one or more passageway flutes 265 may proceed substantially spirally along the passageways 34 and 32, continuously or intermittently, between the openings 255 and 62.

The passageway flutes 265 may be formed into the inner wall surfaces 250 by machining operations such as drilling, milling, rifling, and broaching, or by progressive die forming, or by a combination thereof.

The first opening 255 may comprise a diameter greater than the diameter of the second opening 62. The passageways 34 and 32 may at least partially taper inwardly from the first opening 255 toward the second opening 62.

Optionally, at least a portion of the one or more passageway flutes 265 along the passageway's inner wall 250 may comprise a removable flute insert 295. The removable flute insert 295 may comprise a linearly tapered configuration. And it may be wedged between the passageway's inner wall 250 and the outer wall 280 of a transmission line 30. The removable flute insert may comprise an annular configuration 300. The annular removable flute insert 300 may also comprise a tapered configuration corresponding to the taper of the passageways.

The passageways 34 and 32 may comprises a removable annular liner 305 comprising an outer wall surface and an inner wall surface. The outer wall surface of the removable annular liner 305 may comprise flutes 310 corresponding to and suitable for mating with the passageway flutes 265. The outer wall surface of the removable annular liner 305 may comprise a tapered portion corresponding to the taper of the passageways 34 and 32. Furthermore, the inner wall surface of the removable annular liner 305 may comprise flutes 310 suitable for mating with the flutes 275 of the transmission line conduit 30. The inner wall surface of the annular liner 305 may comprise a taper corresponding to the taper of the passageways 34 and 32.

The tubular transmission line 30 may be disposed within the passageways 265. The tubular transmission line may comprise a coaxial cable 280 housed within a metal tube 30. The tubular transmission line 30 may comprise one or more axial flutes 275 along its exterior surface. The one or more passageway flutes 265 may mate with the tubular transmission line flutes 275 when the transmission line 30 is disposed within the passageways 34 and 32. The tubular transmission line 30 may at least partially house coaxial cable 280 comprising a dielectric 285 material as an insulator surrounding a center electrical conductor 290.

The flutes may be formed in the liner 305 and the transmission line 30 by roll forming, pressing, stamping, and hammering.

The removable annular liner 305 may comprise a hardness as measured on the Rockwell C scale greater than the hardness of the annular tool joints 24 and 26. The shoulder groove 240 and the passageways 34 and 32 may also comprise hardened surfaces. Surface hardening may be achieved through shot peening, laser peening, brinelling, or a chemical etching and coating processes.

The following portion of the detailed description is taken from the '999 reference and applies equally to the present invention except for the modifications.

Referring to (Prior Art) FIG. 5, a cross-sectional view of a drill rig 10 is illustrated drilling a borehole 14 into the earth 16 using downhole tools (collectively indicated by numeral 12). The collection of downhole tools 12 form at least a portion of a drill string 18. In operation, a drilling fluid is typically supplied under pressure at the drill rig 10 through the drill string 18. The drill string 18 is typically rotated by the drill rig 10 to turn a drill bit 12e which is loaded against the earth 16 to form the borehole 14.

Pressurized drilling fluid is circulated through the drill bit 12e to provide a flushing action to carry the drilled earth cuttings to the surface. Rotation of the drill bit may alternately be provided by other downhole tools such as drill motors, or drill turbines (not shown) located adjacent to the drill bit 12e. Other downhole tools include drill pipe 12a and downhole instrumentation such as logging while drilling tools 12c, and sensor packages (not shown). Other useful downhole tools include stabilizers 12d, hole openers, drill collars, heavyweight drill pipe, sub-assemblies, under-reamers, rotary steerable systems, drilling jars, and drilling shock absorbers, which are all well known in the drilling industry.

Referring to (Prior Art) FIG. 6, a downhole tool 12a may include a box end 24 and a pin end 26. A pin end 26 may thread into a box end 24, thereby enabling the connection of multiple tools 12 together to form a drill string 18. Due to the inherent nature of drilling, most downhole tools 12a have a similar cylindrical shape and a central bore 28. The central bore 28 is used to transport drilling fluids, wireline tools, cement, and the like through the drill string 18.

The wall thickness 36 surrounding the central bore 28 is typically designed in accordance with weight, strength, and other constraints, needed to withstand substantial torque placed on the tool 12a, pressure within the central bore 28, flex in the tool 12a, and the like. Because of the immense forces placed on the tool 12a, milling or forming a channel or passageway in the wall 36 of the downhole tool 12a to accommodate a transmission line 30 may excessively weaken the wall. Thus, in most cases, the only practical route for a transmission line 30 is through the central bore 28 of the downhole tool 12a.

Nevertheless, routing the transmission line 30 through the central bore 28 may expose the transmission line 30 to drilling fluids, cements, wireline tools, or other substances or objects passing through the central bore 28. This can damage the transmission line 30 or create interference between the transmission line 30 and objects or substances passing through the central bore 28. Thus, in selected embodiments, a transmission line 30 is preferably maintained as close to the wall 36 of the central bore 28 as possible to minimize interference. In selected embodiments, the transmission line 30 is protected by a conduit 30 or other protective covering 30 to protect the internal transmission medium (e.g. wire, fiber, etc.).

As illustrated, at or near the box end 24 and pin end 26 of the tool 12a, the central bore 28 may be narrower and the surrounding tool wall 38 may be thicker. This increases the strength of the downhole tool 12a at or near the tool joints, which undergo a great deal of stress during drilling. In addition, the added thickness 38 may enable channel or passageways 32, 34, to be milled or formed in the walls 38 to accommodate a transmission line 30 without critically weakening the tool 12a. The channel or passageways 32, 34 may exit the downhole tool 12a at or near the ends of the tool 12a, where the transmission line 30 may be coupled to transmission elements (not shown) to transmit information across the tool joints.

Figure 2:
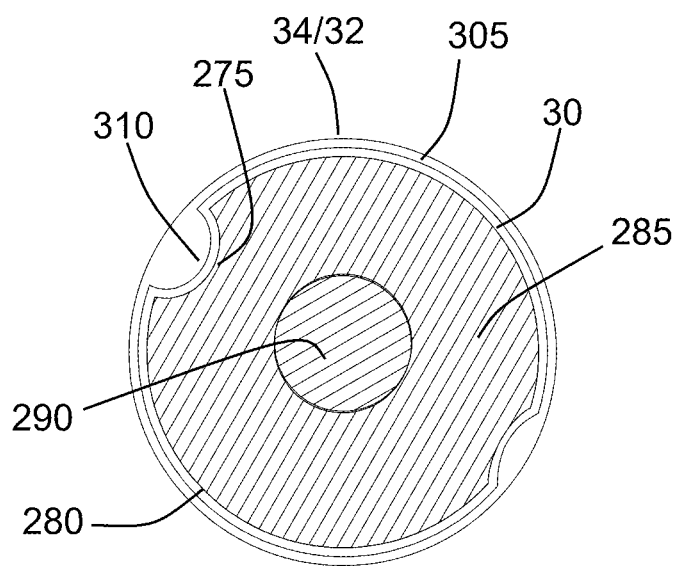
FIG. 2 is a plan view of an embodiment of passageway comprising a fluted liner at an opening of the present invention.
Figure 3:
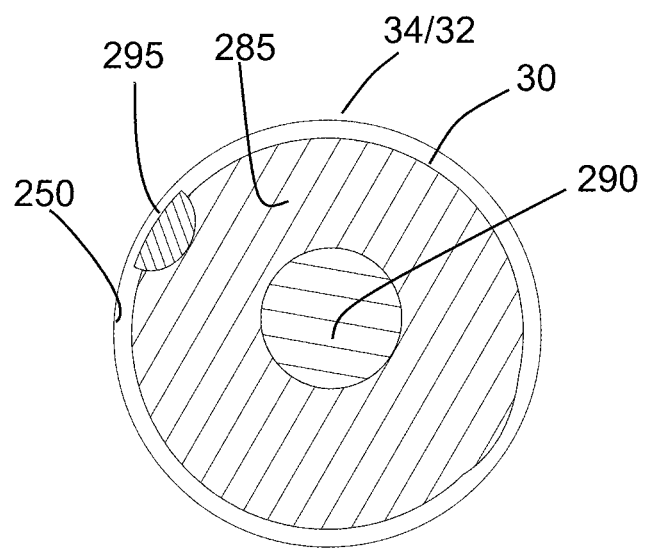
FIG. 3 is a plan view of another embodiment of the passageway opening comprising a flute insert of the present invention.
Figure 4:
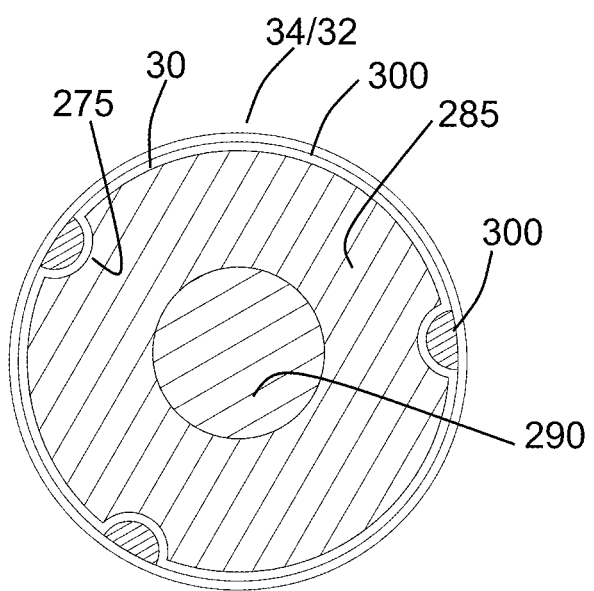
FIG. 4 is a plan view of another embodiment of the passageway opening comprising an annular flute insert of the present invention.
Figure 16:
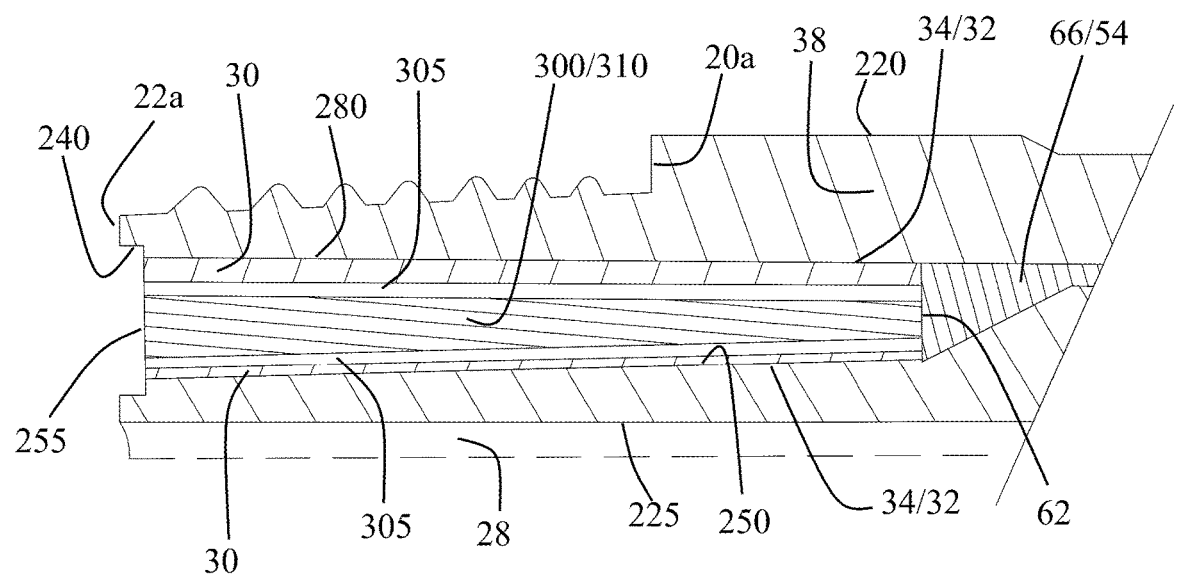
FIG. 16 is a longitudinal cutaway side view diagram of the tapered liner and flute of the present invention.
Figure 17:
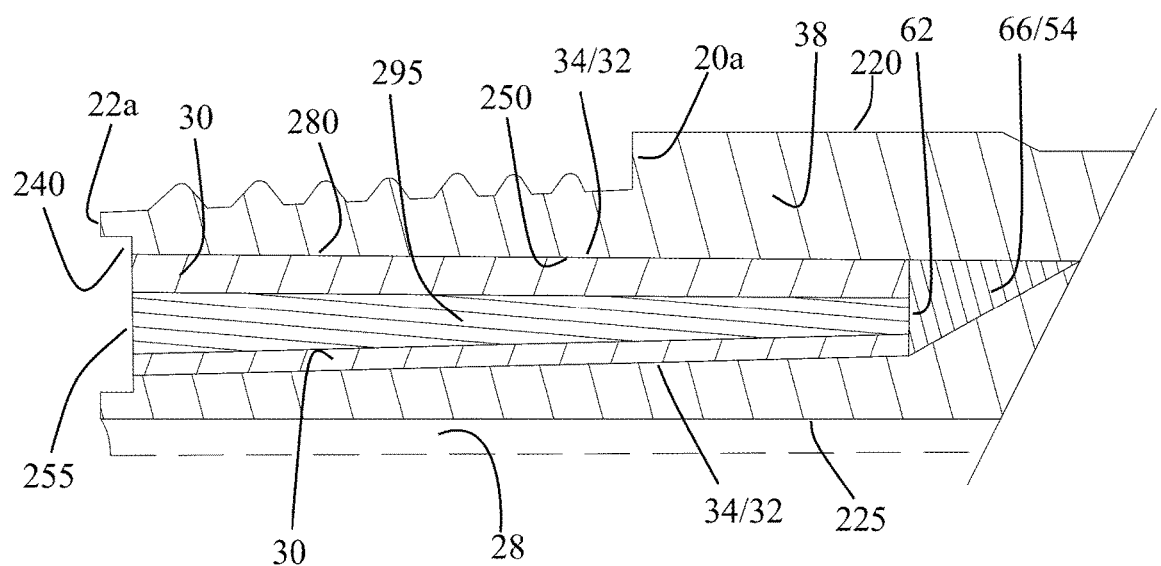
FIG. 17 is a longitudinal cutaway side view diagram of the tapered flute of the present invention.

Referring to (Prior Art) FIG. 7, in contrast to the downhole tool 12a illustrated in FIG. 2, certain downhole tools 12c may be characterized by a tool wall 40 of greater thickness. For example, at or near the bottom hole assembly 12e, a drill string 18 may include various heavyweight tools 12c, such as heavyweight drill pipe 12c or sections of drill collar 12c. Such tools 12c may have a central bore 28 having a substantially constant inside diameter between the box end 24 and the pin end 26. Due to the substantially constant diameter of the central bore 28, a distinct solution is needed to route a transmission line 30 through the downhole tool 12c. For example, in selected embodiments, as illustrated, a transmission line 30 may be routed such that it bends or angles away from the longitudinal axis 11 of the tool 12c at or near the box and pin ends 24, 26. The transmission line 30 travels through the central bore 28 along the central portion of the tool 28. At or near the box end 24 and pin end 26, the transmission line 30 is routed into channel or passageways 32, 34 to connect to transmission elements (not shown). Because of the unique configuration of the downhole tool 12c, novel apparatus and methods are needed to create the channel or passageways 32, 34 and route the transmission line 30 in a manner that avoids kinking or other damage to the transmission line 30.

Referring to (Prior Art) FIGS. 8A and 8B, in drill tools 12a like that described with respect to FIG. 2, a transmission line 30 may travel through channel or passageways 32, 34 formed in the box end 24 and pin end 26 of a downhole tool 12a. As illustrated, the box end 24 and pin end 26 may include primary shoulders 20a, 20b and secondary shoulders 22a, 22b. In operation, the primary shoulders 20a, 20b may absorb the majority of the stress imposed on the tool joint. Nevertheless, the secondary shoulders 22a, 22b may also absorb a significant, although lesser, amount of stress. Because of the lower stress, and also because the secondary shoulders 22a, 22b are more internally protected than the primary shoulders 20a, 20b, transmission elements may be located on the secondary shoulders 22a, 22b.

In selected embodiments, it may be desirable to shorten the channel or passageways 32, 34 between the transmission elements and the central bore 28 as much as possible to conserve the time and expense of creating the channel or passageways 32, 34. For example, in some downhole tools 12a, the channel or passageways 32, 34 may be formed by gun-drilling the box end 24 and pin end 26. Normally, a box end 24 or pin end 26 is characterized by a restricted bore 50a, 50b having a narrower diameter, and an expanded bore 52a, 52b having a larger diameter. The expanded bore 52a, 52b is typically sized to mate with and roughly equal the diameter of the central bore 28 of the drill tool 12a. Between the restricted bore 50 and the expanded bore 52 is typically a transition region 54a, 54b where the restricted bore 50 transitions to the expanded bore 52. To prevent tools, drilling fluids, or other substances from lodging themselves within the central bore 28, the transition region 54 is typically configured to provide a smooth or graded transition between the restricted bore 50 and the expanded bore 52.

In selected embodiments, the channel or passageways 32, 34 may be formed in the box end 24 and pin end 26 through the tool wall surrounding the restricted bore 50a, 50b. When the channel or passageways 32, 34 reach the transition regions 54a, 54b, the channel or passageways break through the tool wall into the expanded bore 52a, 52b. Because the length of the restricted bore 50a, 50b is roughly proportional to the length of the channel or passageways 32, 34 traveling though the tool wall, the channel or passageways 32, 34 may be shortened by shortening the restricted bore 50 and lengthening the expanded bore 52. This provides a desired effect since the process of gun-drilling may be costly and time-consuming. Thus, apparatus and methods are needed to reduce or shorten the channel or passageways 32, 34.

Referring to (Prior Art) FIGS. 9A and 9B, for example, in selected embodiments, the restricted bore 50 may extend a specified distance through the box end 24 and pin end 26. The channel or passageways 32, 34 may be drilled through only a portion of the tool wall, but not actually exit into the central bore 28.

Referring to (Prior Art) FIGS. 10A and 10B, once the channel or passageways 32, 34 are drilled or formed, portions of the tool wall 60 may be removed by counter-boring the restricted bore 50, thereby exposing the channel or passageways 32, 34 to the central bore 28. Thus, the length of the channel or passageways 32, 34 and the distance drilled may be reduced. In other embodiments, the restricted bore 50 may be shortened before drilling the channel or passageways 32, 34. In yet other embodiments, the box end 24, the pin end 26, or both, may be redesigned to have a restricted bore 50 of a reduced length, thereby reducing the distance needed to drill the channel or passageways 32, 34. In selected embodiments, a drill bit, such as may be used for gun-drilling, may be damaged if it breaks into the central bore, or if it breaks into the central bore at a non-perpendicular angle. In such cases, a backing plate (not shown) or other material may be inserted into the central bore when drilling the channel or passageways 32, 34. This may prevent the drill bit from breaking out of the tool wall into the central bore 28.

Referring to (Prior Art) FIGS. 11A and 11B, in another embodiment, a box end 24 and pin end 26 may be designed such that the channel or passageways 32, 34 break into the enlarged bore 52 at a right angle. This may be accomplished by making the transition regions 54a, 54b substantially perpendicular to the longitudinal axis 11 of the downhole tool 12. Thus, in some embodiments, a drill bit, such as a drill bit used for gun-drilling, may break into the enlarged bore at a right angle, thereby preventing damage to the bit. Nevertheless, this configuration may be undesirable in some applications, since the transition regions 54a, 54b may hinder the passage of tools or other substances passing through the central bore 28 of a downhole tool 12.

Referring to (Prior Art) FIGS. 12A and 12B, in applications where the central bore 28 is relatively constant, such as may be found in heavyweight drill pipe or drill collar, channel or passageways 32, 34 are needed to route a transmission line through such tools. Nevertheless, because of the constant or near constant bore 28 of the tool, other methods are needed to provide a route for a transmission line. For example, in contrast to the drill tool illustrated in (Prior Art) FIGS. 8A and 8B, the drill tool illustrated in (Prior Art) FIGS. 12A and 12B lacks a transition region 54a, 54b where the channel or passageways 32, 34 can exit into the central bore 28.

In selected embodiments, channel or passageways 32, 34 may be initially drilled in the tool wall of the box end 24 and pin end 26. The channel or passageways 32, 34 may be drilled such that they do not exit or break into the central bore 28, thereby preventing damage to the drill bit. In selected embodiments, the channel or passageways 32, 34 may be drilled substantially parallel to the longitudinal axis 11 of the downhole tool 12. Once the channel or passageways 32, 34 are drilled, open channel or passageways 66 may be milled into the inside wall of the central bore 28 to open up the channel or passageways 32, 34 to the central bore 28.

In selected embodiments, the open channel or passageways 66 may be shaped to provide a smooth transition for a transmission line routed between the channel or passageways 32, 34 and the central bore 28. For example, the open channel or passageways 66 may include a first surface 68 substantially parallel to the channel or passageways 32, 34, and a curve 74 or bend 74 to guide the transmission line towards the central bore 28. Likewise, a second bend 74 or curve 74 may enable a transmission line to gently bend from the open channel or passageway 66 to a position along the inside wall of the central bore 28. Thus, the open channel or passageway 66 may be shaped, as needed, to prevent kinking or other damage to a transmission line.

Referring to (Prior Art) FIGS. 13A and 13B, in another embodiment, channel or passageways 32, 34 may be drilled at a nominal angle 76 with respect to and toward, the longitudinal axis 11 of the downhole tool from the secondary shoulder towards the central bore 28. The angle 76 is a positive, nominal angle with respect to the longitudinal axis 11, but is by design greater than a "zero" degree angle, which may be canted slightly due to variations caused by hole tolerances. The angle 76 may be limited by the geometry of the box end 24 and pin end 26 in some cases but is generally oriented greater than about 0.25 degrees in a positive direction, toward the longitudinal axis 11. For example, the angle 76 may be limited by the angle of the threaded portion of the box end 24. In some cases, the angle 76 of the channel or passageways 32, 34 may form an angle of less than or equal to 15 degrees with respect to the longitudinal axis 11 of the downhole tool. In a preferred embodiment, the positive angle 76 is between about 0.25 degrees and about 15 degrees.

In selected embodiments, the channel or passageways 32, 34 may be drilled such that they do not actually break into the central bore 28 to prevent damage to the drill bit. Once the channel or passageways 32, 34 are drilled, a milling tool (not shown) may be inserted into the central bore 28 to open up the channel or passageways 32, 34 to the central bore 28. For example, open channel or passageways 66 may be milled in the wall of the central bore 28 to open up the channel or passageways 32, 34 and to provide a smooth transition for a transmission line routed from the channel or passageways 32, 34 to the central bore 28.

Referring to (Prior Art) FIG. 14, a milling tool 78, as was previously mentioned with respect to (Prior Art) FIGS. 12A, 12B, 13A, and 13B, may be inserted into the central bore 28 of a downhole tool 12. The milling tool 78 may include a milling bit 80 that may be used to mill the open channel or passageway 66 into the wall of the central bore 28. To form the open channel or passageway 66, the milling tool may be moved in various directions 81 as needed and may or may not be computer controlled to provide accurate movement.

Referring to (Prior Art) FIG. 15, as was previously mentioned with respect to (Prior Art) FIGS. 13A and 13B, the channel or passageways 32, 34 may be drilled at an angle 86 with respect to the longitudinal axis 11 of the tool 12. Since drilling machinery 88, such as machinery 88 used for gun-drilling, may be large and complex, the drill tool 12 may be tilted at a desired angle 84 with respect to the drilling machine 88. In selected embodiments, an adjustable arm 86 may be used to support one end of the drill tool 12. The height of the adjustable arm 86 may be adjusted as needed to adjust the angle 84 of the drill tool with respect to the drill bit 82.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. A modified tubular system, comprising:
   a tool joint comprising a tube having an axial central bore having a threaded pin end and a threaded box end opposite the threaded pin end;
   the threaded pin end and the threaded box end each comprising an annular wall varying in thickness separating an outside wall surface from an inside axial central bore wall surface;
   the annular wall comprising an annular primary and annular secondary shoulder adjacent the threaded portions of the threaded pin end and the threaded box end, respectively;
   one or more longitudinally tapered passageway formed in the annular wall between the inside axial central bore wall surface and the outside wall surface, the longitudinally tapered passageway comprising a longitudinally tapered passageway inner wall, the longitudinally tapered passageway comprising a first opening intersecting a groove in the annular secondary shoulder and a second opening intersecting an opening in the inside axial central bore wall surface connecting the longitudinally tapered passageway with the axial central bore, the first opening having a larger diameter than the second opening and the longitudinally tapered passageway tapering by reducing the diameter of the passageway along its length between the first opening and the second opening, and wherein
   the longitudinally tapered passageway comprises one or more longitudinally tapered flutes tapering by reducing the diameter of the flutes along the longitudinal passageway's inner wall between the first opening and the second opening.

2. The modified tubular system of claim 1, wherein the one or more longitudinal passageway flutes initiate apart from one of the first and second openings.

3. The modified tubular system of claim 1, wherein the one or more longitudinal passageway flutes terminate apart from the first and second openings.

4. The modified tubular system of claim 1, wherein the one or more longitudinal passageway flutes proceed substantially linearly along the passageway between the first and second openings.

5. The modified tubular system of claim 1, wherein the one or more longitudinal passageway flutes proceed substantially spirally along the passageway between the first and second openings.

6. The modified tubular system of claim 1, wherein the one or more longitudinal passageway flutes mate with a tubular transmission line comprising longitudinal tubular flutes disposed within the passageway.

7. The modified tubular system of claim 6, wherein the tubular transmission line at least partially houses a coaxial cable comprising a dielectric material surrounding a center electrical conductor.

8. The modified tubular system of claim 1, wherein at least a portion of the one or more longitudinal passageway flutes along the passageway inner wall comprises a removable flute insert.

9. The modified tubular system of claim 8, wherein the removable flute insert comprises a linearly tapered configuration all along the passageway inner wall from the first opening to the second opening.

10. The modified tubular system of claim 8, wherein the removable flute insert comprises an annular configuration.

11. The modified tubular system of claim 10, wherein the annular removable flute insert comprises a longitudinal tapered configuration from the first opening to the second opening.

12. The modified tubular system of claim 1, wherein the one or more longitudinal passageways comprise a removable annular liner comprising an outer wall surface and an inner wall surface.

13. The modified tubular system of claim 12, wherein the outer wall surface of the removable annular liner comprises longitudinal flutes corresponding to and suitable for mating with the longitudinal passageway flutes.

14. The modified tubular system of claim 12, wherein the outer wall surface of the removable annular liner comprises a longitudinal tapered portion corresponding to the longitudinal taper of the one or more longitudinal passageways.

15. The modified tubular system of claim 12, wherein the inner wall surface of the removable annular liner comprises longitudinal flutes suitable for mating with longitudinal flutes of a transmission line conduit.

16. The modified tubular system of claim 12, wherein the inner wall surface of the annular liner comprises a longitudinal taper corresponding to the taper of the one or more longitudinal passageways.

17. The modified tubular system of claim 12, wherein the removable annular liner comprises a hardness as measured on the Rockwell C scale greater than a hardness of the tool joint.

18. The modified tubular system of claim 1, wherein the longitudinally tapered flutes are formed in and along the longitudinally tapered passageway inner wall.

* * * * *